(No Model.) 3 Sheets—Sheet 1.
J. DONNELLY, W. McLAREN & A. TRASK.
AXLE BOX FOR RAILWAY CARS.

No. 420,778. Patented Feb. 4, 1890.

Witnesses.
E. S. Duffy
H. E. Peck

J. Donnelly,
W. McLaren,
A. Trask,
Inventors:-
per O. E. Duff
Attorney (No Model.) 3 Sheets—Sheet 2.
J. DONNELLY, W. McLAREN & A. TRASK.
AXLE BOX FOR RAILWAY CARS.
No. 420,778. Patented Feb. 4, 1890.
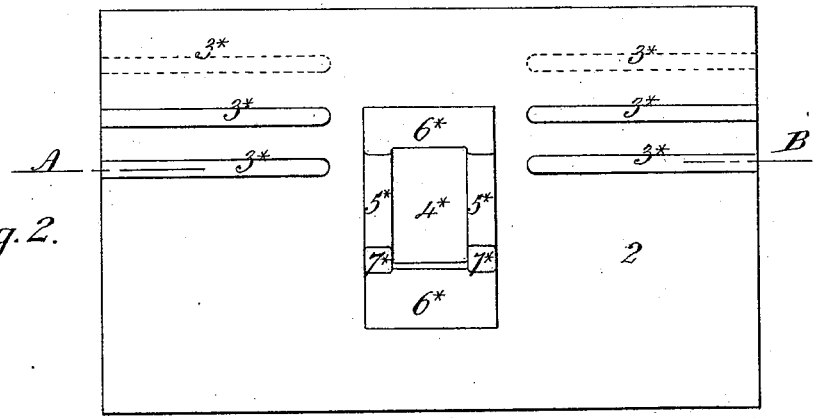
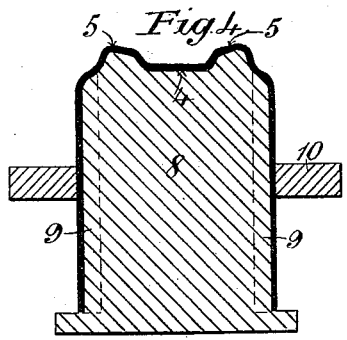
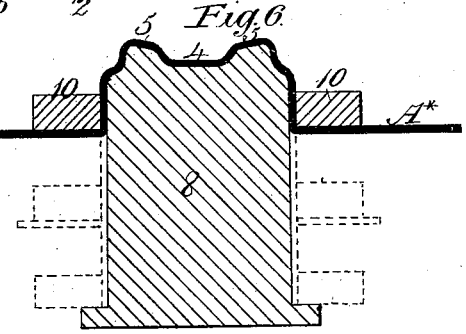
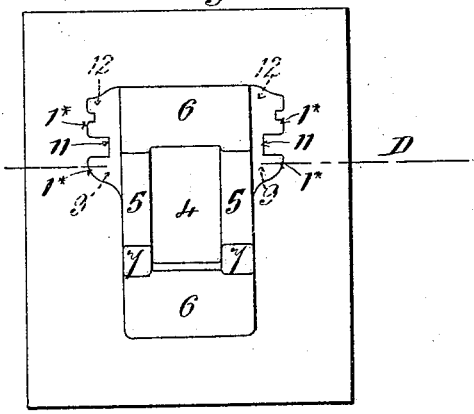
Witnesses.
W. Cross.
F. J. Bringham
Inventors
John Donnelly
William McLaren
Ambrose Trask
Atty. O. E. Duffy (No Model.)  3 Sheets—Sheet 3.

J. DONNELLY, W. McLAREN & A. TRASK.
AXLE BOX FOR RAILWAY CARS.

No. 420,778. Patented Feb. 4, 1890.

UNITED STATES PATENT OFFICE.

JOHN DONNELLY, OF PARLIAMENT STREET, WILLIAM McLAREN, OF MOORFIELDS, COUNTY OF MIDDLESEX, AND AMBROSE TRASK, OF BROCKLEY, COUNTY OF KENT, ENGLAND.

AXLE-BOX FOR RAILWAY-CARS.

SPECIFICATION forming part of Letters Patent No. 420,778, dated February 4, 1890.

Application filed April 24, 1888. Serial No. 271,731. (No model.)

*To all whom it may concern:*

Be it known that we, JOHN DONNELLY, of Parliament Street, WILLIAM McLAREN, of Moorfields, county of Middlesex, and AMBROSE TRASK, of Brockley, county of Kent, in the Kingdom of Great Britain and Ireland, subjects of the Queen of Great Britain and Ireland, have invented an Improvement in Axle-Boxes, of which the following is a specification.

Axle-boxes for railway-carriages and other vehicles have been cast; also, they have been made of wrought metal in several parts, such parts being forged to the required shape by steam-hammers, welded together in a mold or receptacle of the required shape, and afterward machined and finished.

Now this invention has for its object to make axle-boxes of a light description and in a cheap and simple manner. For this purpose an axle-box according thereto is made wholly or partly of sheet metal of suitable thickness by cutting and pressing or stamping, so as to convert the sheet to the required form in suitable dies actuated by hydraulic or other machinery. It may be by a steam-hammer. Such sheet-metal axle-boxes may be formed, as described, in parts of appropriate shape that are afterward fastened together by any suitable means, such as rivets or bolts.

In order that the manner of carrying our invention into practice may be readily understood, reference is made to the accompanying drawings, in which—

Figure 1:
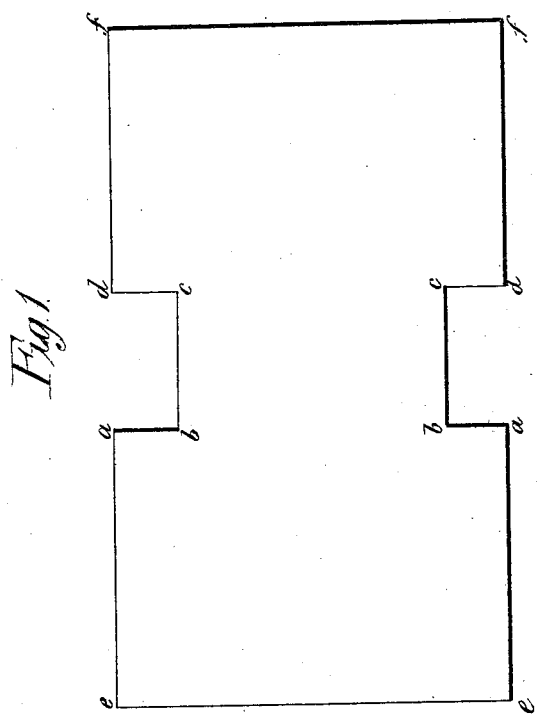
Figure 7:
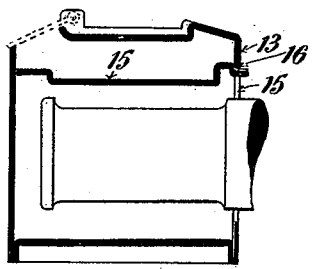
Figure 8:
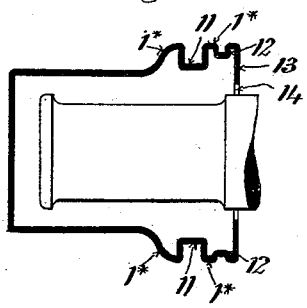
Figure 9:
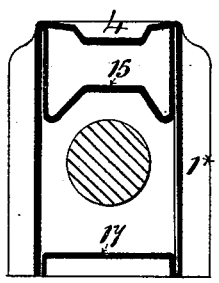

Figure 1 represents one form of a sheet-metal plate for conversion into an axle-box according to this invention. Fig. 2 is a plan of one of the stamps or dies used for subjecting the sheet-metal plate to the first stamping or pressing operation. Fig. 3 is a longitudinal vertical section of a pair of stamps or dies with a sheet of metal between them, the form of the dies and plate corresponding to the section of the stamp or die taken in the line A B, Fig. 2. Fig. 4 is a vertical section in the line C D, Fig. 5; and Fig. 5, a plan or top view illustrating the second pressing or stamping operation for converting the plate into an axle-box. Fig. 6 illustrates a modified operation. Figs. 7, 8, and 9 are respectively a vertical section, a horizontal section, and a transverse section of a complete axle-box constructed according to this invention with an axle-journal located therein.

The sheet of metal A to be stamped or pressed to shape is of approximately rectangular form, as shown in Fig. 1, parts of the plate corresponding with the two areas $a\ b\ c\ d$ being cut away.

In the first operation the sheet-metal plate is subjected to a stamping or pressing operation between stamps or dies 1 and 2, whereby it is formed with two sets of ridges or corrugations 3, a recessed part 4, upwardly-inclined parts 5 5, downwardly-inclined parts 6 6, and raised bosses or parts 7 7, Fig. 5, the acting surfaces of the stamps or dies being made of corresponding form and figured $3^\times$, $4^\times$, $5^\times$, $6^\times$, and $7^\times$. The plate thus formed is then subjected to a second operation, in which it is placed upon a block or die 8, the upper surface of which is formed to correspond with the parts 4, 5, 6, and 7 of the plate. Two opposite sides of the block or die 8 are flat, and the other two opposite sides are each provided with vertical ribs or projections 9.

10 is a bolster or die plate formed with an opening, the internal configuration of which corresponds in form with the exterior outline in a horizontal direction of a complete axle-box as shown in plan, Fig. 5. This bolster is placed upon the plate, (which is preferably held upon the block or die 8 by a correspondingly-formed die or pressure plate,) and is then forced downward at one stroke or stage by suitable means—such as a hydraulic press—whereby the side portions of the plate are forced or pressed down to form the four sides of the axle-box, the corrugations 3 in the plate being so arranged with reference to the block or die 8 as to form by the action of the projections 9 on such block or die and the corresponding adjacent parts of the bolster projecting portions $1^\times$, the space between each pair of which forms a groove 11, that serves as a horn-plate or axle-guard guide. During this second operation the two sets of edges $a\,e$ and $d\,f$ of the plate are brought together, and each set of edges $a\,b$ and $d\,c$ are brought against the adjacent edge $b\,c$. These adjacent edges of the plate are afterward united by welding in a manner well understood.

Instead of forcing down the bolster 10 in one operation, it may be forced down in successive operations or stages, as indicated in Fig. 6, the horizontal portions of the plate being heated before each of such stamping or pressing operations.

By providing the die 1 with additional ribs or projections, as shown in dotted lines in Fig. 2, and the die 2 with corresponding grooves, the plate A will be formed with additional corrugations, which, when the plate is subjected to the second operation, will be formed into additional grooves 12 12, as shown more clearly in Fig. 8, and which will serve for the reception of a dust-guard. For this purpose the exterior of the block or die 8 and the internal configuration of the bolster 10 must be correspondingly modified, as shown in Fig. 5. The recessed part 4 serves for the reception of the buckle of a carriage-spring and the inclined parts 5 5 as bearings for the adjacent portions of such spring.

The inner side 13, Figs. 7 and 8, of the axle-box produced by the operations hereinbefore described has a portion thereof cut away, as shown at 14, for the entrance of the journal end of an axle.

15, Figs. 7 and 9, is a second stamped plate secured in any suitable manner. It may be by welding to the upper part of the box and serving in conjunction therewith as a grease box and also as a bearing for the reception of the liner, brass, or bearing for the axle-journal. It is formed by stamping or pressing in dies in a similar manner to the first plate, and is provided with a hole for the passage of grease. Part of the side 13 may be flanged outward, as shown at 16, and to it part of the stamped plate 16 may be welded.

17, Fig. 9, is a third stamped plate secured to the lower part of the axle-box in any convenient manner and serving as a keep therefor. One of the inclined parts 6 at the top of the box is, in the example shown in Fig. 7, cut away for the insertion of grease, and the opening thus formed is provided with a hinged cover. (Shown in dotted lines.)

It will be obvious that axle-boxes differing somewhat in form from that shown may be constructed in accordance with this invention.

It is to be understood that we do not lay any general claim to the manufacture of axle-boxes of wrought-iron, but that our invention has reference essentially to the manufacture of axle-boxes from sheet metal by stamping or pressing to shape in such a manner as to obviate the necessity for machining as distinguished from the forging of such boxes out of pieces of metal not in the form of sheets, and which necessitate machining to produce the finished box—as, for instance, in order to make the grooves for axle-guards or horn-plate, the seat for springs, and the grooves for dust-guards.

We declare that what we claim is—

1. As a new article of manufacture, an axle-box formed of plate metal and having at opposite sides hollow ribs or projecting portions $1^\times$ pressed out of the body of the box and integral therewith to form external grooves for axle-guards, the metal of said body and ribs or projecting portions being of approximately uniform thickness throughout.

2. As a new article of manufacture, an axle-box formed of plate metal and having at opposite sides ribs or projecting portions pressed out of the body of the box and integral therewith, some of the said ribs or projecting portions being arranged to form external grooves for axle-guards and others to form internal grooves for a dust-guard, the metal of said body and ribs or projecting portions being of approximately uniform thickness throughout.

3. As a new article of manufacture, an axle-box formed of plate metal and having at opposite sides hollow ribs or projections pressed out of and integral with the body of the box to form external grooves for axle-guards, and at the top a spring-seat, also pressed out of and integral with the body of the box, the metal of said body, ribs or projections, and spring-seat being of approximately uniform thickness throughout.

4. As a new article of manufacture, an axle-box made entirely of sheet metal of uniform thickness throughout and consisting of a shell bent to shape and having at opposite sides hollow ribs or projections pressed out of the metal of the shell and integral therewith, some of said ribs or projections being arranged to form vertical external grooves for axle-guards and others to form vertical internal grooves for a dust-guard, and at the top a spring-seat, also pressed out of and integral with the body metal of the shell, substantially as herein described.

5. As a new article of manufacture, an axle-box made entirely of plate metal of uniform thickness throughout and consisting of a shell bent to shape with grooves for axle-guards, and a plate-metal seating located within and secured to said shell and adapted to receive a liner or bearing for an axle-journal, substantially as described.

6. As a new article of manufacture, an axle-box shell formed of plate metal of uniform thickness throughout and having at opposite sides hollow ribs or projections $1^\times$ pressed out of the metal of the shell to form external vertical grooves 11 for axle-guards and internal vertical grooves 12 for a dust-guard, and at its top a recessed spring-seat 4, also pressed out of the metal of the shell, substantially as herein described and shown.

7. As a new article of manufacture, an axle-box shell bent to shape with grooves 11 for axle-guards, grooves 12 for dust-guards, recessed seat 4 for carriage-spring, and seating 15, secured within said shell and adapted to receive a liner or bearing for an axle-journal, said shell and seating being constructed of plate metal of approximately uniform thickness throughout, substantially as herein described.

In testimony whereof we have signed our names to this specification in the presence of two subscribing witnesses.

JOHN DONNELLY.
WILLIAM McLAREN.
AMBROSE TRASK.

Witnesses:
T. J. BROUGHAM,
W. CROSS,
Both of 46 *Lincoln's Inn Fields, London*.